United States Patent
Seo et al.

(10) Patent No.: US 9,442,363 B2
(45) Date of Patent: Sep. 13, 2016

(54) STEREO CAMERA MODULE APPARATUS AND METHOD

(75) Inventors: Ja-won Seo, Suwon-si (KR); Doo-Sik Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 736 days.

(21) Appl. No.: 13/640,951

(22) PCT Filed: Apr. 7, 2011

(86) PCT No.: PCT/KR2011/002465
§ 371 (c)(1),
(2), (4) Date: Oct. 12, 2012

(87) PCT Pub. No.: WO2011/129550
PCT Pub. Date: Oct. 20, 2011

(65) Prior Publication Data
US 2013/0033584 A1 Feb. 7, 2013

(30) Foreign Application Priority Data
Apr. 12, 2010 (KR) .......................... 10-2010-0033471

(51) Int. Cl.
*H04N 13/02* (2006.01)
*G03B 35/10* (2006.01)
*G03B 17/14* (2006.01)
*G03B 17/56* (2006.01)

(52) U.S. Cl.
CPC .............. *G03B 35/10* (2013.01); *G03B 17/14* (2013.01); *G03B 17/565* (2013.01); *H04N 13/0239* (2013.01); *H04N 13/0296* (2013.01); *H04N 2213/001* (2013.01)

(58) Field of Classification Search
None
See application file for complete search history.

(56) References Cited

U.S. PATENT DOCUMENTS

| 7,190,389 B1 * | 3/2007 | Abe et al. ....................... 348/42 |
| 2001/0014221 A1 | 8/2001 | Tomita |
| 2001/0051509 A1 | 12/2001 | Mukai et al. |
| 2003/0072570 A1 | 4/2003 | Seo |
| 2008/0058008 A1 * | 3/2008 | Yoon .......................... 455/556.1 |
| 2008/0064437 A1 | 3/2008 | Chambers et al. |

(Continued)

FOREIGN PATENT DOCUMENTS

| JP | 2001022014 | 1/2001 |
| JP | 2001231055 | 8/2001 |
| JP | 2006235316 | 9/2006 |

(Continued)

OTHER PUBLICATIONS

Korean Office Action dated Mar. 16, 2016 issued in counterpart application No. 10-2010-0033471, 8 pages.

*Primary Examiner* — Geepy Pe
*Assistant Examiner* — Joseph Becker
(74) *Attorney, Agent, or Firm* — The Farrell Law Firm, P.C.

(57) ABSTRACT

A stereo camera module includes a substrate provided with a plurality of installation brackets, a plurality of camera modules rotatably coupled to the installation brackets, a rotating part provided on the installation brackets so as to be rotatably coupled to a rotation coupling part provided on the camera modules, a driving unit provided on the installation brackets for rotatably driving the camera modules using magnetic force, and a control unit for adjusting the magnetic force generated by the driving unit by applying a current, which corresponds to inputted angle-adjustment data, to the driving unit to thereby control the rotation of the camera modules using the adjusted magnetic force.

9 Claims, 9 Drawing Sheets

(56) References Cited

U.S. PATENT DOCUMENTS

2008/0253003 A1* 10/2008 Shin et al. .................. 359/824
2011/0150441 A1* 6/2011 Ollila et al. ................. 396/55
2011/0158625 A1* 6/2011 Chiang ....................... 396/133

FOREIGN PATENT DOCUMENTS

| KR | 1020020069290 | 8/2002 |
|----|---------------|--------|
| KR | 1020070012588 | 1/2007 |
| KR | 1020070092202 | 9/2007 |

* cited by examiner

STEREO CAMERA MODULE APPARATUS AND METHOD

PRIORITY

This application is a National Phase Entry of PCT International Application No. PCT/KR2011/002465, which was filed on Apr. 7, 2011, and claims priority to Korean Patent Application Serial No. 10-2010-0033471, which was filed in the Korean Intellectual Property Office on Apr. 12, 2010, the contents of each of which are incorporated herein by reference.

BACKGROUND OF THE INVENTION

1. Field of the Invention

The present invention relates generally to a stereo camera module including a small number of components, which can adjust an angle so that a plurality of camera modules can perform a convergence or divergence function by using magnetic force.

2. Description of the Related Art

A three dimensional (3D) image generally corresponds to a technology that renders a cubic effect to an object within the image by adding information on depth and space forming which is not included in a two dimensional image.

The cubic effect is generated by a difference between left and right images received by a human's two eyes, and recognized by one's brain as the 3D image through a combination process. The cubic effect uses a binocular parallax generated when two eyes spaced apart from each other by about 65 mm view an image in two slightly different directions.

In order to photograph such a 3D image, two cameras interworking with each other are required. When a conventional portable communication apparatus includes one camera module such as a digital camera, it uses a method of combining two images after first photographing one image and then photographing the other image. However, this method cannot photograph a desired 3D image when a subject moves since a time difference is generated while the two images are photographed. Furthermore, it is difficult to equally maintain photographed areas, making it very difficult to achieve the 3D image.

In order to solve the above-mentioned problem, FIGS. 1 and 2 illustrate a stereo camera module 1 in filed U.S. Patent Application Publication No. 2003-0072570 A1, which includes a camera body 2 including a camera lens 2a and an image sensor (Charge Coupled Device (CCD)) 2b, a stereo adaptor 3 mounted to the camera body 2, rotating mirrors 4 installed in the stereo adaptor 3, and fixed mirrors 5.

As shown in FIGS. 1 and 2, the conventional stereo camera module 1 obtains a 3D image by using the left and right rotating mirrors 4 and the left and right fixed mirrors 5 arranged in front of the camera lens 2a, and an obtained shape arrives at the image sensor 2b via an image wide-angle system.

The stereo camera module 1 may apply the convergence function since convergence is possible through a rotation based on the rotating mirrors 4.

However, the conventional stereo camera module should include rotating mirrors and fixed mirrors, and requires a driving apparatus for rotating each of the rotating mirrors, which makes a product size too large and miniaturization too difficult.

Accordingly, there is a need in the art for apparatuses configured to control an angle such that a plurality of camera modules performs a convergence function or a divergence function to generate a 3D or wide-angle image by using magnetic force.

SUMMARY OF THE INVENTION

An aspect of embodiments of the present invention is to provide a stereo camera module which can generate a 3D image or a wide-angle image with a smaller number of components by configuring such that an angle is controlled so that a plurality of camera modules perform a convergence or divergence function by using magnetic force.

An aspect of embodiments of the present invention is to provide a stereo camera module which enables miniaturization and slimming of the product through the reduction in the number of components by configuring such that an angle is controlled so that a plurality of camera modules perform a convergence or divergence function by using magnetic force.

An aspect of embodiments of the present invention is to provide a stereo camera module for reducing manufacturing costs of the product through the reduction in the number of components by configuring such that an angle is controlled so that a plurality of camera modules perform a convergence or divergence function by using magnetic force.

In accordance with an aspect of the present invention, there is provided a stereo camera module including a substrate comprising a plurality of mounting brackets, a plurality of camera modules rotatably coupled with the mounting brackets, a rotator mounted to the mounting brackets to be rotatably coupled with a rotation connector mounted to the camera modules, a driver mounted to the mounting brackets to drive the camera modules to rotate by using magnetic force, and a controller for adjusting the magnetic force generated in the driver by applying a current corresponding to input angle-adjusting information to the driver, and controlling a rotation of the plurality of camera modules through the adjusted magnetic force.

In accordance with another aspect of the present invention, there is provided a method of driving a stereo camera module including inputting angle-adjusting information for adjusting a rotation angle of each camera module of the stereo camera module by a user, applying each current corresponding to the input angle-adjusting information to each driver included in said each camera module, and forming a magnetic field in each driver according to said applied each current, and rotating said each camera module by the formed magnetic field.

BRIEF DESCRIPTION OF THE DRAWINGS

The above and other aspects, features, and advantages of embodiments of the present invention will be more apparent from the following description taken in conjunction with the accompanying drawings, in which.

DETAILED DESCRIPTION OF EMBODIMENTS OF THE INVENTION

Figure 1:
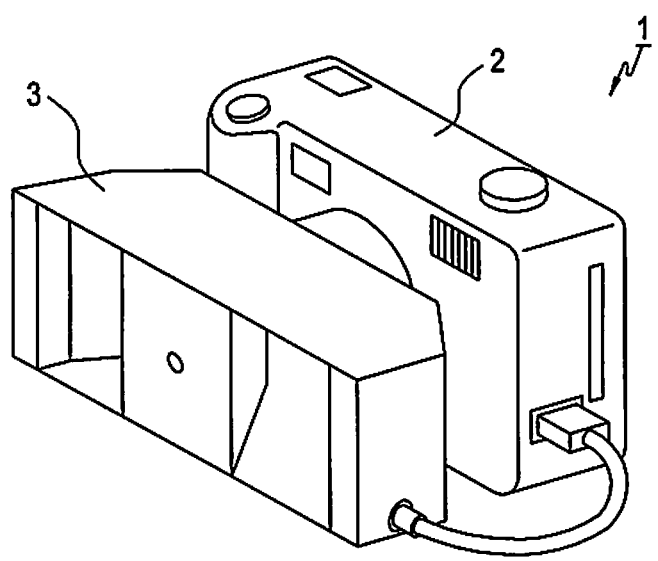
FIG. 1 illustrates a state in which a conventional stereo camera is used.
Figure 2:
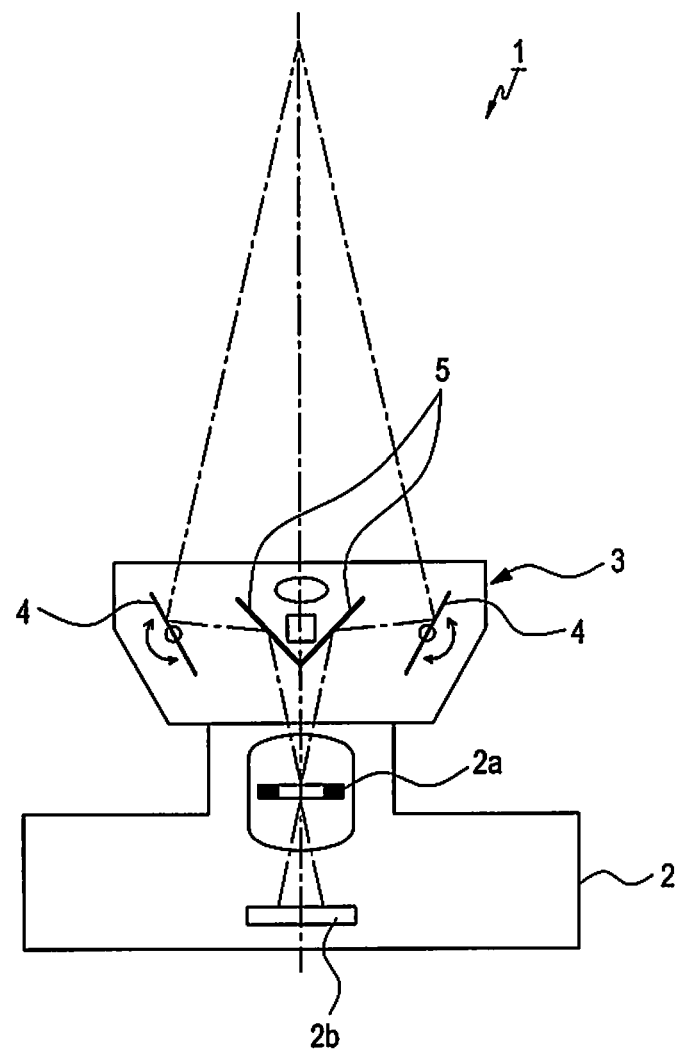
FIG. 2 illustrates a state in which the conventional stereo camera is used.

Hereinafter, embodiments of the present invention will be described in detail with reference to the accompanying drawings. It should be noted that throughout the accompanying drawings, identical components will be referred to as identical reference numerals. In the following description of the present invention, a detailed description of known functions and configurations incorporated herein will be omitted for the sake of clarity and conciseness.

Referring to FIGS. 3 to 8, a stereo camera module 10 according to embodiments of the present invention includes a substrate 20 including two mounting brackets 21, two camera modules including first and second camera modules 31 and 32, a rotator 40, a driver 50, and a controller 60.

In the present invention, a number of drivers 50 correspond to a number of camera modules to drive each of the camera modules. Since the present invention relates to the stereo camera module including the camera modules 31 and 32, it is assumed that a number of drivers 50 is two. For example, when there are three camera modules, the number of drivers becomes three.

The substrate 20 can include the mounting bracket 21, and camera modules 30 are coupled with the mounting brackets 21 such that the camera modules 30 can rotate about a hinge axis A1.

The mounting brackets 21 have a box shape, one side of which has an opening 21b as shown in FIG. 4 and FIGS. 6 to 8, but the mounting brackets 21 can have other shapes, such as a circle, diamond, or rectangle,. A circuit throughhole 21a for penetrating a flexible printed circuit 33 installed in the camera module 30 is formed in the mounting bracket 21.

The camera module 30 includes a plurality of camera modules such as the first camera module 31 and the second camera module 32.

Figure 3:
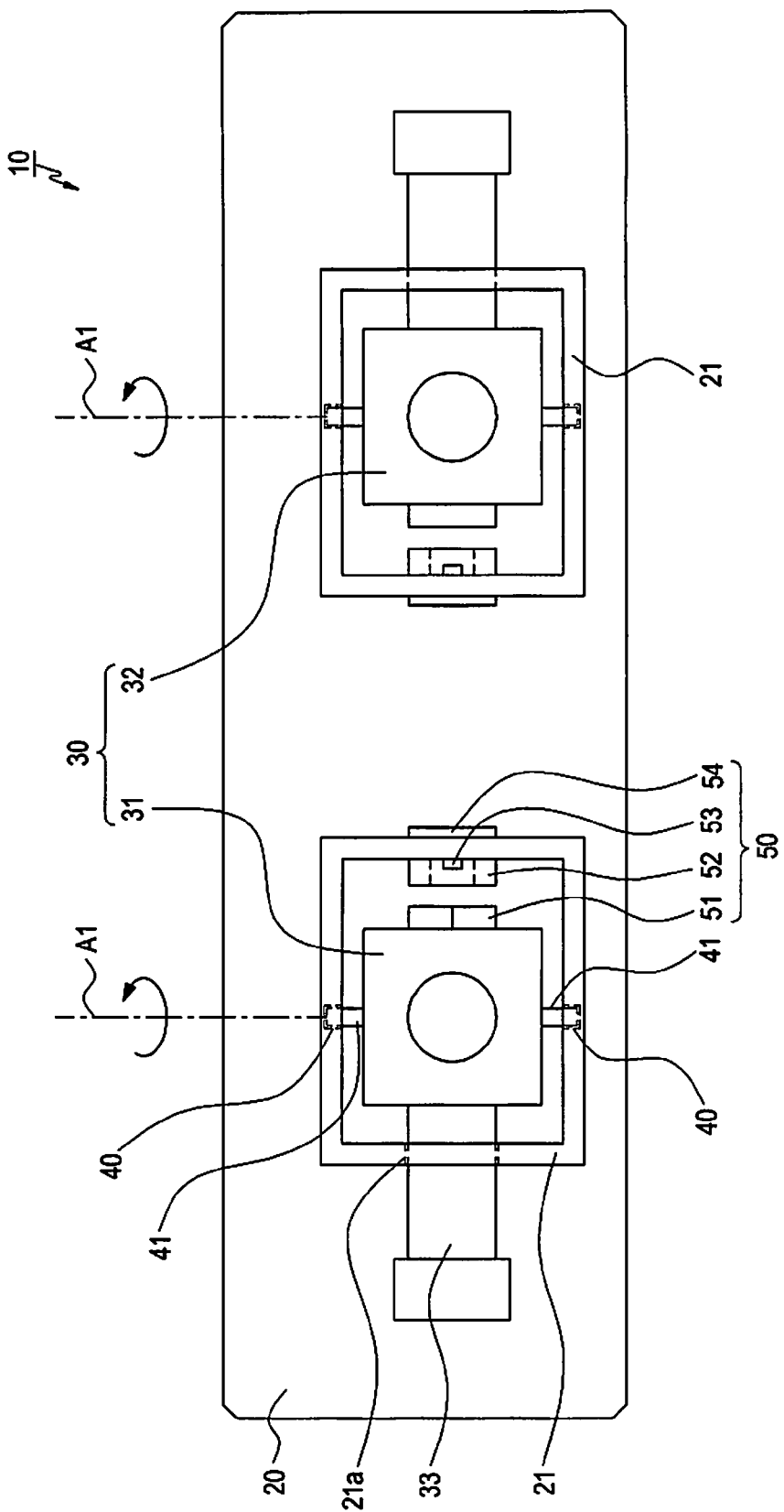
FIG. 3 illustrates a configuration of a stereo camera module according to an embodiment of the present invention.
Figure 4:
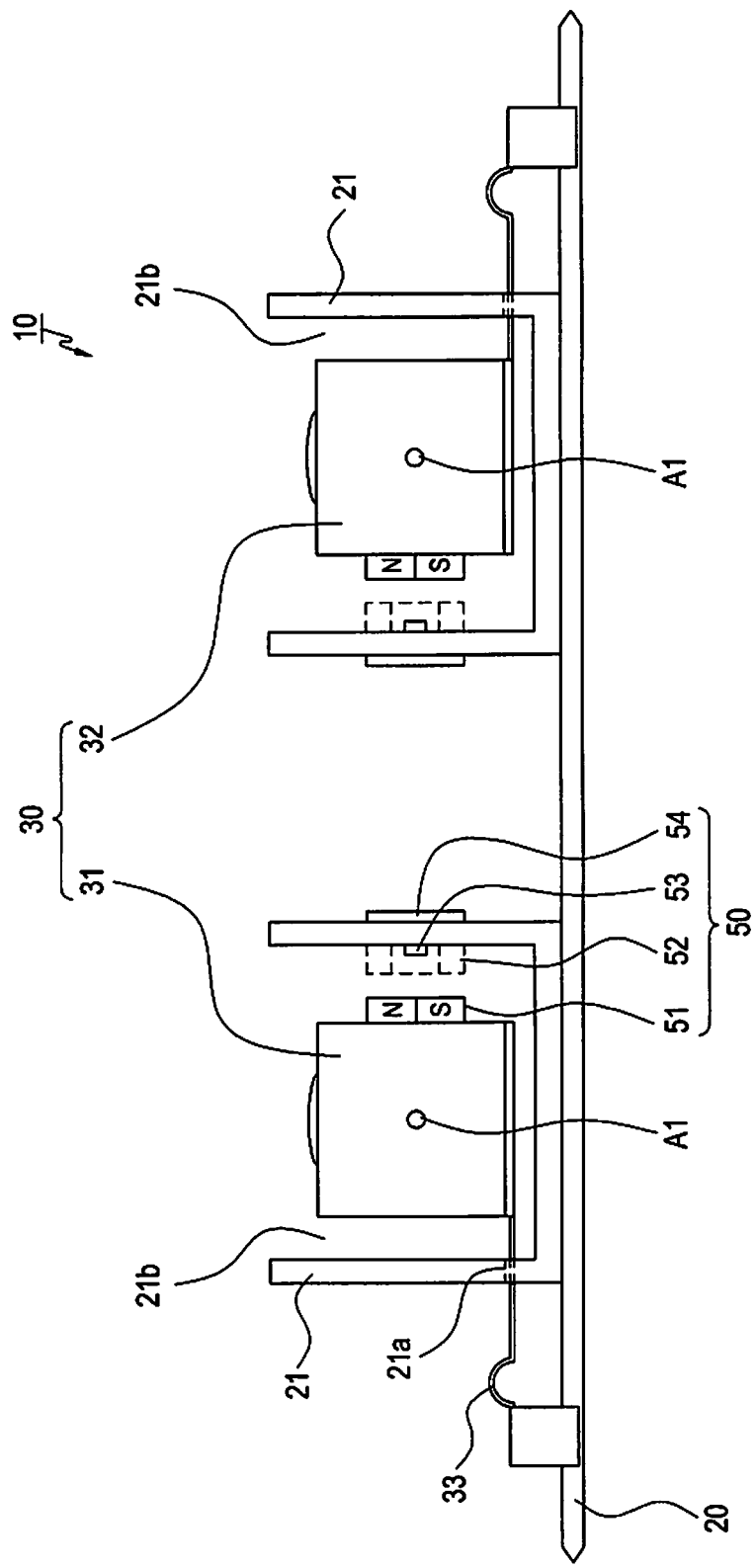
FIG. 4 illustrates a configuration of a stereo camera module according to an embodiment of the present invention.
Figure 6:
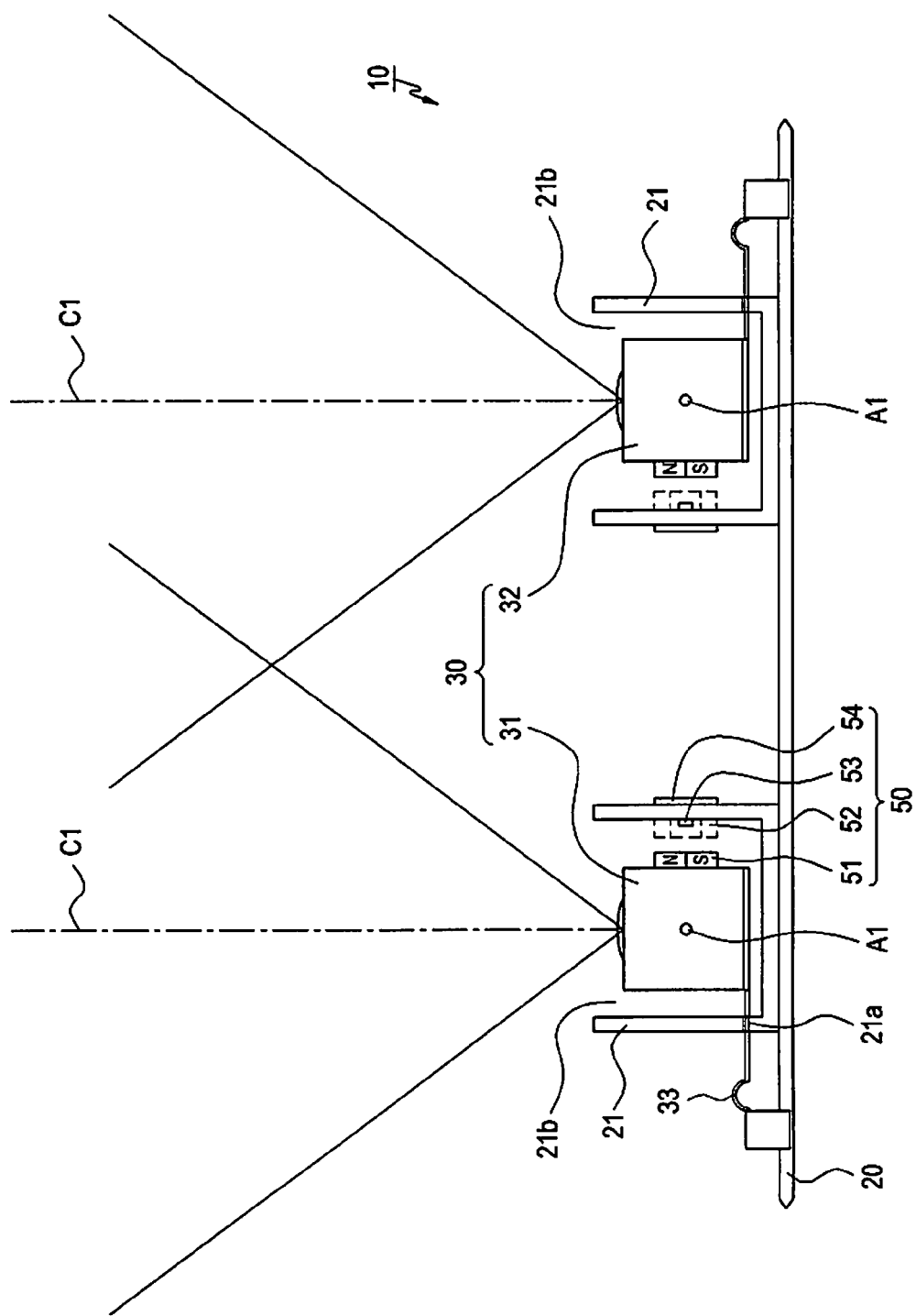
FIG. 6 illustrates a normal state of a stereo camera module according to an embodiment of the present invention.
Figure 7:
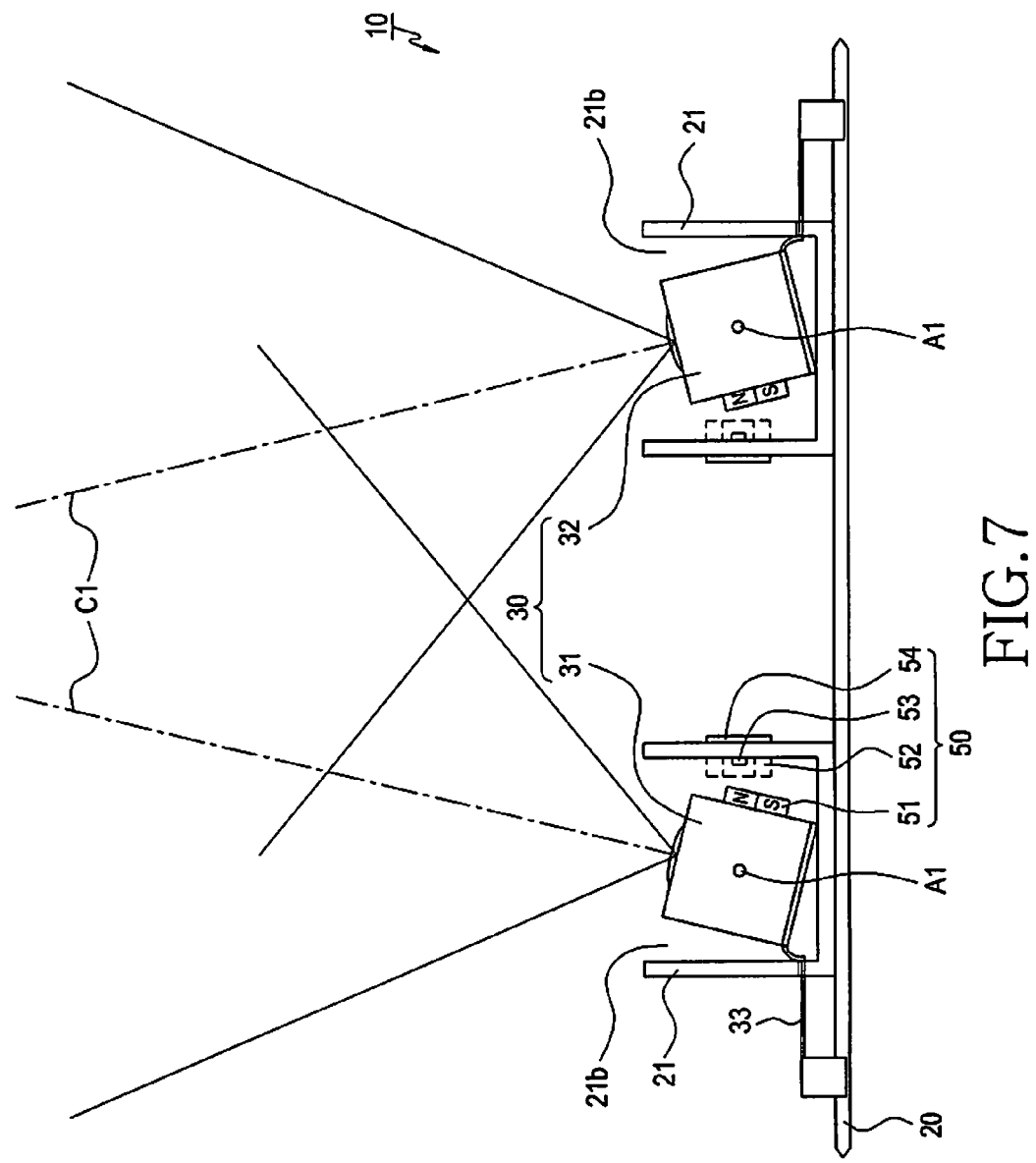
FIG. 7 illustrates operations states of camera modules when a stereo camera module photographs a 3D image according to an embodiment of the present invention.
Figure 8:
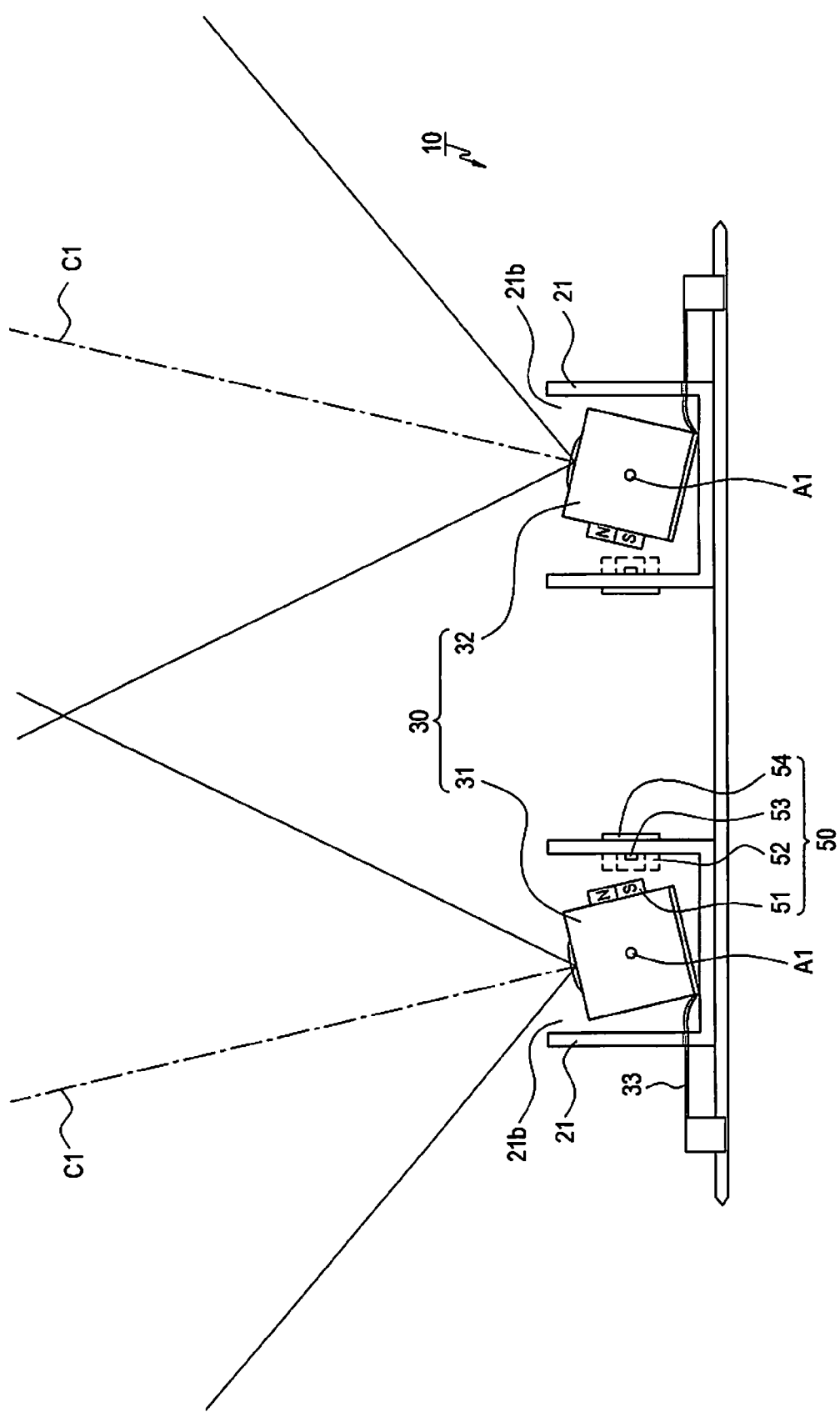
FIG. 8 illustrates operation states of camera modules when a stereo camera module photographs a wide-angle image according to an embodiment of the present invention.

The rotator 40 is mounted to the mounting bracket 21 such that the rotator 40 is coupled with a rotation connector 41 mounted to the camera module 30 so as to rotate about the hinge axis A1 as shown in FIG. 3, and the rotation connector 41 includes protrusions (not shown) to be coupled with the rotator 40, which includes grooves (not shown). The rotator 40 is arranged perpendicularly to an optical axis C1 of the camera module 30, coupled with a rotation connector, and includes grooves so that the rotator 41 rotates about a hinge axis A1 as shown in FIGS. 6 to 8.

The driver 50 is installed in the mounting bracket 21 so that the camera module 30 rotates about the hinge axis A1. Referring to FIGS. 3 to 8, the driver 50 includes a magnetic body 51, a coil 52, a Hall sensor 53, and a yoke unit 54.

The magnetic body 51 may be mounted to one side of the camera module 30 such that the magnetic body 51 corresponds to the coil 52, which will be described below.

The coil 52 is arranged in a position corresponding to the magnetic body 51, and may be mounted to the mounting bracket 21 so that the camera module 30 rotates about the hinge axis A1 by an interaction between an electric field generated according to a direction and an intensity of a current applied from the controller 60 and a magnetic field of the magnetic body 51.

That is, the direction and the intensity of the current supplied to the coil 52 change an emission direction and a size of the electric field generated in the coil 52. When the emission direction and the size of the electric field are changed, the magnetic body 51 also moves, such as by rotation, as a result of the interaction. Since the magnetic body 51 is coupled with the camera module 30, if the magnetic body 51 rotates in a predetermined direction, the camera module 30 rotates in a corresponding direction.

The Hall sensor 53 detects a rotation position change of the magnetic body 51, and is surrounded by the coil 52 for signaling. The yoke unit 54 is mounted to the camera module 30 so that the camera module 30 is fixed in place by the electric field of the magnetic body 51.

The controller 60 adjusts a rotation angle of the camera module 30 by controlling the driver 50 according to input angle-adjusting information (for example, information input according to a menu control by a user).

Figure 5:
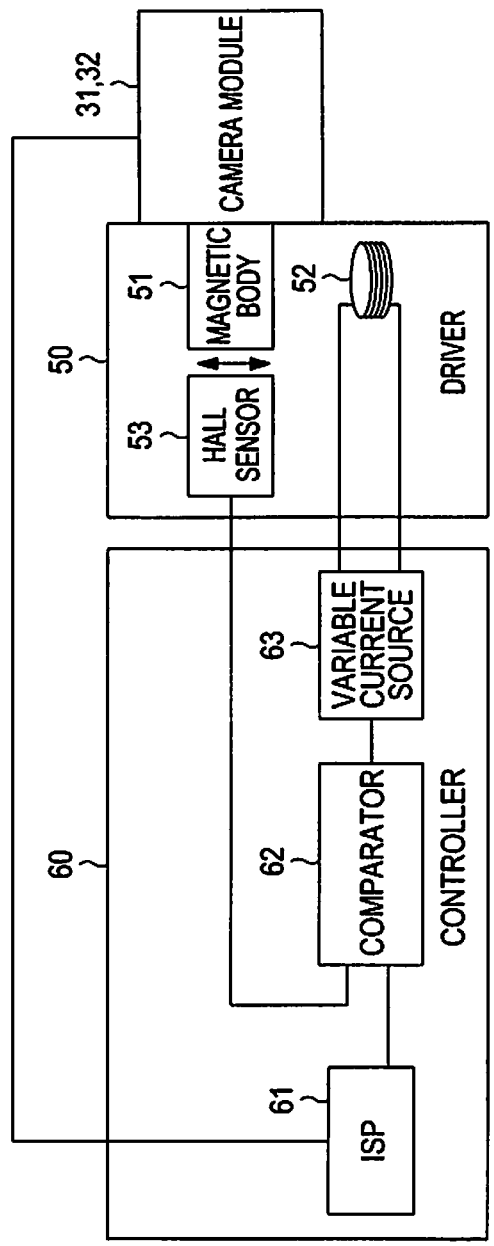
FIG. 5 illustrates a driver and a controller among a configuration of a stereo camera module according to an embodiment of the present invention.

Referring to FIG. 5, the controller 60 includes an Image Signal Processor (ISP), a comparator 62, and a variable current source 63.

The image signal processor 61 processes an image signal photographed by the camera module 30 and transmits the angle-adjusting information to the comparator 62. The angle-adjusting information is selected or input through a menu control by the user of a portable terminal. It is assumed that the angle-adjusting information is received by the image signal processor 61 from a controller (not shown) of the portable terminal equipped with the camera module 30 according to embodiments of the present invention.

The comparator 62 compares the angle-adjusting information transmitted from the image signal processor 61 with a detected signal input from the Hall sensor 53, amplifies a difference value between the two values, and then transmits the amplified difference value to the variable current source 63.

The variable current source 63 applies a current changed (for example, current, an applying direction and a size of which are changed) according to the difference value received from the comparator 62 to the coil 52. For example, when the difference value received from the comparator 62 has a large value, a current having a large value is applied to the coil 52. When the difference value has a small value, a current having a small value is applied to the coil 52.

The coil 52 forms a magnetic field having a predetermined direction (for example, magnetic force line) and a predetermined size (for example, density of the magnetic force line) according to the current applied from the variable current source 63, and the formed magnetic field moves (for example, rotates at a predetermined angle) the magnetic body 51 by the interaction in a predetermined direction.

Since the magnetic body 51 according to embodiments of the present invention has a structure of being coupled with the camera module 31 and the camera module 32, if each magnetic body 51 mounted to the camera module 31 and the camera module 32 rotates, the camera module 31 and the camera module 32 also rotate about the hinge axis A1.

The Hall sensor (or Hall effect sensor) 53 detects a degree (for example, a rotation angle) of a rotation of the magnetic body 51, and transmits the degree of the rotation to the comparator 62 as the detected signal value. That is, the Hall sensor 53 detects a degree of a rotation of the camera module 31 and the camera module 32, and can output the degree of the rotation to comparator 62 as the detected signal value.

The stereo camera module 30 according to embodiments of the present invention may be applied to a portable communication apparatus (not shown) as a representative application example. However, the portable communication apparatus is not necessarily limited to a mobile communication terminal, and may be applied to various types of terminals (for example, bar type, folder type, and sliding type terminals) employing the camera module 30.

Examples of the portable communication apparatus according to embodiments of the present invention may include not only all mobile communication terminals operated based on a communication protocol corresponding to various communication systems, but also all types of information communication devices and multimedia devices such as a digital camera, a PMP (Portable Multimedia Player), an MP3 (Motion Pictures Experts Group-Layer Audio 3) player, a navigation, a game machine, a notebook computer, a signboard, a TV, a digital broadcast player, a PDA (Personal Digital Assistant), and a smart phone, and application devices for the same.

As shown in FIGS. 5 to 8, the coil 52 generates an electric field according to an applied current, and the generated electric field rotates the first and second camera modules 31 and 32 about the hinge axis A1 by an interaction with a magnetic field of the magnetic body 51.

The Hall sensor 53 detects a rotation position change of the magnetic body 51 rotating together with the first and second camera modules 31 and 32, and signalizes the detected rotation position change.

As shown in FIG. 8, the controller 60 and the driver 50 rotate the first and second camera modules 31 and 32 until the detected signal value of the Hall sensor 53 corresponds to a signal value for generating a wide-angle image of the image signal processor 61, and also spread the optical axis C1 of the first and second camera module 31 and 32. Similar to the convergence angle control, the controller 60 and the driver 50 adjust a direction and an intensity of the current applied to the coil 52 until the wide-angle image is generated through a feedback (for example, negative feedback) by the detected signal value of the Hall sensor 53 and the signal value for generating the wide-angle image of the image signal processor 61, and thus adjust a divergence angle of the first and second camera module 31 and 32.

Figure 9:
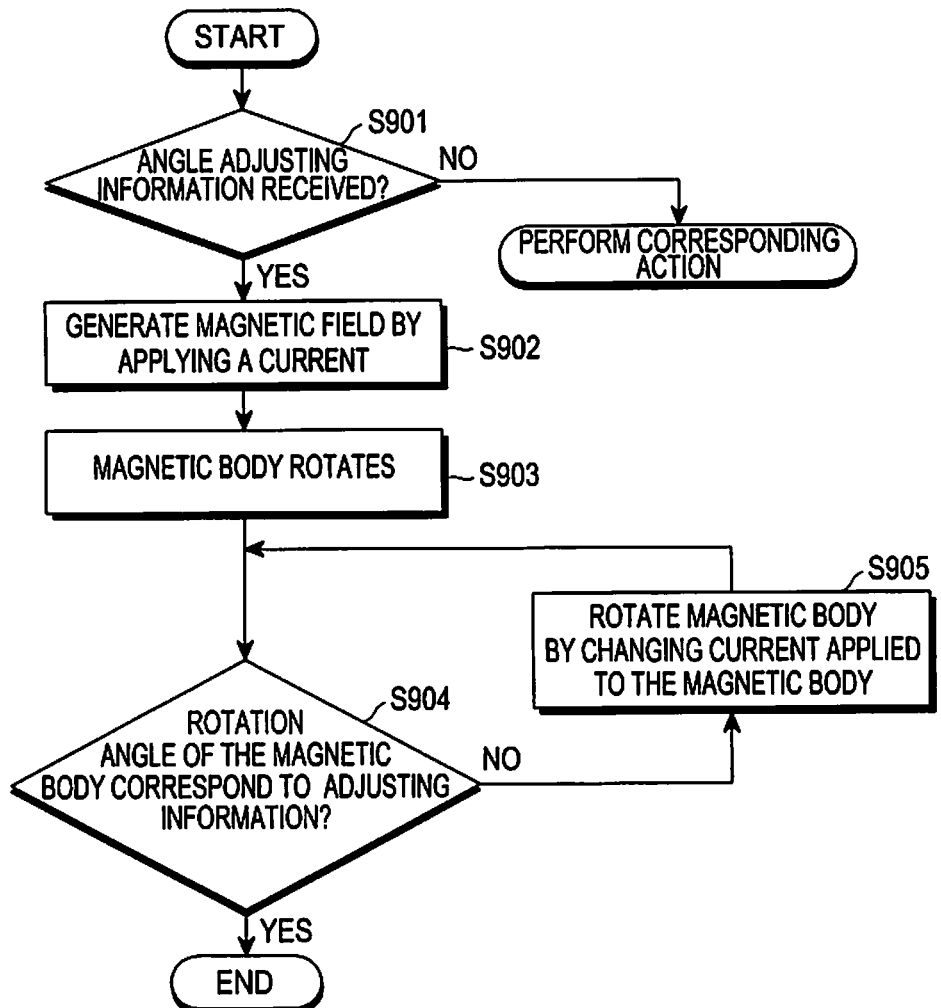
FIG. 9 illustrates a method of driving a stereo camera module according to an embodiment of the present invention.

FIG. 9 illustrates a method of driving the stereo camera module according to embodiments of the present invention. FIG. 9 is described with reference to FIGS. 3 to 8.

In step S901, the controller 60 receives angle-adjusting information from the user.

As described above, the angle-adjusting information is input by the user, and the user can select (for example, select a zoom in/out) a view angle of the stereo camera module 30 by selecting a photographing mode desired to be used to photograph images by using the stereo camera module 30 according to embodiments of the present invention. The photographing mode includes, for example, a mode of photographing a 3D image, and a mode of photographing a fisheye image. That is, when the user photographs images such as still or moving pictures by using the camera module 30 which is the stereo camera module including the camera module 31 and the camera module 32, the user can select or input a view angle in photographing the image. For example, the user can select to photograph the image at a view angle of 45.99° (corresponding to a focal length of 50 mm) or a view angle of 121.02° (corresponding to a focal length of 12 mm) when photographing the image by using the camera module 30.

For example, with respect to the optical axis C1 shown in FIG. 6, an optical axis C1 shown in FIG. 7 corresponds to an optical axis changed from the optical axis C1 of the camera module by the convergence through an input of the angle-adjusting information so as to photograph the 3D image, and an optical axis C1 corresponds to an optical axis changed from the optical axis C1 of the camera module 30 by the divergence through an input of the angle-adjusting information so as to photograph the fisheye image.

The mode of photographing the 3D image corresponds to a mode of photographing an image by controlling (for example, convergence rotation) the view angle of the camera module 31 and the camera module 32 so as to photograph an image similar to an image received by a human's eyes. The mode of photographing the fisheye image corresponds to a mode of photographing an image equal to an image photographed through a fisheye lens by controlling (for example, divergence rotation) the view angle of the camera module 31 and the camera module 32 to be a super wide-angle (for example, a view angle greater than or equal to 180°).

In steps S902 to S903, the controller 60 controls to generate a magnetic field by applying a current to the coils 52.

The controller 60 controls the variable current source 63 corresponding to each of the camera module 31 and the camera module 32 so that a current having a predetermined direction and intensity is applied to the coil 52 corresponding to the camera module 31 and the coil 52 corresponding to the camera module 32, which causes the camera module 31 and the camera module 32 to rotate according to input angle-adjusting information. It is assumed that characteristics (direction and size) of the current input according to the input angle-adjusting information are registered in a reference table (not shown), and the controller 60 controls such that a current having characteristics corresponding to the angle-adjusting information input by the user is applied to the coil 52 with reference to the reference table. Thereafter, each magnetic body 51 coupled with the camera module 31 and the camera module 32 rotates according to the direction and the intensity of the current applied from the variable current source 63. If the magnetic body 51 rotates, the camera module 31 and the camera module 32 coupled with each magnetic body 51 also rotate, respectively.

For example, when the angle-adjusting information input in step S901 divergence-rotates the camera module 31 and the camera module 32 by 15° with respect to the optical axis C1 shown in FIG. 6, respectively, the controller 60 controls the current applied to the coil 52 of the driver 50 corresponding to the camera module 31 so that the camera module 31 rotates in a left direction by 15° with respect to the optical axis C1 shown in FIG. 6, and controls the current applied to the coil 52 of the driver 50 corresponding to the camera module 32 so that the camera module 32 rotates in a right direction by 15° with respect to the optical axis C1 shown in FIG. 6.

The camera module 30 shown in FIG. 8 is divergence-rotated from the camera module 30 shown in FIG. 6. Since the rotation direction of the camera module 31 and the rotation direction of the camera module 32 are opposite to each other, the current applied to the coil 52 corresponding to the camera module 31 and the current applied to the coil 52 corresponding to the camera module 32 have the same size and opposite directions.

In steps S904 to S905, the controller 60 identifies whether the rotation angle of the magnetic body 51 corresponds to the input angle-adjusting information. When the rotation angle does not correspond to the angle-adjusting information, the controller 60 controls such that the magnetic body 51 rotates by changing the current applied to the coil 52.

Through steps S902 to S903, if the magnetic body 51 rotates, the Hall sensor 53 of the driver 50 detects a degree of a rotation of the magnetic body 51 and outputs the detected degree of the rotation to the comparator 62 as a detected signal value, and the controller 60 controls such that the comparator 62 compares the detected signal value input from the Hall sensor 53 with the angle-adjusting information input in step S901 to identify whether the two values correspond to each other.

When there is no difference between the two compared values (that is, the detected signal value corresponds to the angle-adjusting information), the controller 60 controls respective rotations of the camera module 31 and the camera module 32 through corresponding current characteristics.

When there is a difference between the two values obtained by the comparator 62 (that is, the detected signal value does not correspond to the angle-adjusting information), the controller 60 controls such that the magnetic body 51 rotates by changing at least one of an intensity and a direction of the current applied to the coil 52. The comparator 62 can compare the detected signal value with the value of the angle-adjusting information, amplify a difference value, and transmit the amplified difference value to the variable current source 63 which can apply the current, an applying direction or a size of which is changed according to the difference value received from the comparator to the coil 52.

The controller 60 according to embodiments of the present invention determines whether the angle-adjusting information input by the user corresponds to the detected signal value with reference to a reference table, and it is assumed that the reference table is stored in a separate memory (not shown, included outside or inside of the controller 60).

The above described stereo camera module according to the present invention is not limited to the aforementioned embodiments and drawings, and it is apparent to those skilled in the art that various modifications, additions and substitutions are possible, without departing from the scope and spirit of the invention as disclosed in the accompanying claims.

The invention claimed is:

1. A method of driving a stereo camera module, comprising:
identifying a photographing mode of the stereo camera module and angle-adjusting information for adjusting a rotation angle of a plurality of camera modules included in the stereo camera module, corresponding to a user input;
determining a rotation direction of each of the plurality of camera modules according to the identified photographing mode;
applying current corresponding to the determined rotation direction and the angle-adjusting information to a driver of each of the plurality of camera modules, in order to rotate each of the plurality of camera modules;
detecting a rotation direction and a rotation angle of each of the plurality of camera modules rotated according to a magnetic field generated by the applied current;
comparing the detected rotation direction and the detected rotation angle with the determined rotation direction and the angle-adjusting information; and
if the detected rotation direction and the detected rotation angle are different from the determined rotation direction and the angle-adjusting information, changing the applied current.

2. The method as claimed in claim 1, wherein the determined rotation direction of each of the plurality of camera modules is different from each other.

3. The method as claimed in claim 1, wherein determining the rotation direction of each of the plurality of camera modules according to the identified photographing mode comprises:
if the identified photographing mode is a first photographing mode, determining the rotation direction of each of the plurality of camera modules such that optical axes of the plurality of camera modules are converged; and
if the identified photographing mode is a second photographing mode, determining the rotation direction of each of the plurality of camera modules such that optical axes of the plurality of camera modules are diverged.

4. The method as claimed in claim 1, wherein controlling the applied current further comprises:
if the detected rotation direction and the detected rotation angle correspond to the determined rotation direction and the angle-adjusting information, maintaining the applied current.

5. A stereo camera module, comprising:
a substrate including a plurality of mounting brackets;
a plurality of camera modules rotatably coupled with the mounting brackets;
a driver mounted to the mounting brackets to rotate the plurality of camera modules by using a magnetic field; and
a controller for:
identifying a photographing mode of the stereo camera module and angle-adjusting information for adjusting a rotation angle of the plurality of camera modules, corresponding to a user input;
determining a rotation direction of each of the plurality of camera modules according to the identified photographing mode;
applying current corresponding to the determined rotation direction and the angle-adjusting information to the driver, in order to rotate each of the plurality of camera modules;
detecting a rotation direction and a rotation angle of each of the plurality of camera modules rotated according to a magnetic field generated by the applied current;
comparing the detected rotation direction and the detected rotation angle with the determined rotation direction and the angle-adjusting information; and
changing the applied current, if the detected rotation direction and the detected rotation angle are different from the determined rotation direction and the angle-adjusting information.

6. The stereo camera module as claimed in claim 5, wherein the determined rotation direction of each of the plurality of camera modules is different from each other.

7. The stereo camera module as claimed in claim 5, wherein the controller determines the rotation direction of each of the plurality of camera modules such that optical axes of the plurality of camera modules are converged, if the identified photographing mode is a first photographing mode, and determines the rotation direction of each of the plurality of camera modules such that optical axes of the plurality of camera modules are diverged, if the identified photographing mode is a second photographing mode.

8. The stereo camera module as claimed in claim 5, wherein the controller maintains the applied current, if the detected rotation direction and the detected rotation angle correspond to the determined rotation direction and the angle-adjusting information.

9. The stereo camera module as claimed in claim 5, wherein the driver comprises:

a magnetic body mounted to each of the plurality of camera modules;

a coil for rotating each of the plurality of camera modules by an interaction between an electric field generated according to the applied current and a magnetic field of the magnetic body, the coil being formed at each position corresponding to the magnetic body in the mounting brackets;

a hall sensor for detecting the rotation direction and the rotation angle of each of the plurality of camera modules, and outputting the detected rotation direction and the detected rotation angle change as a detected signal value, the hall sensor being mounted while being surrounded by each coil; and a yoke unit for fixing into place the stereo camera module by the magnetic field of the magnetic body.

* * * * *